May 30, 1967   W. O. TEETERS   3,321,947
PIPE COUPLING AND METHOD OF MAKING
Filed Sept. 13, 1965   2 Sheets-Sheet 1

INVENTOR.
WILBUR O. TEETERS
BY
ATTORNEY

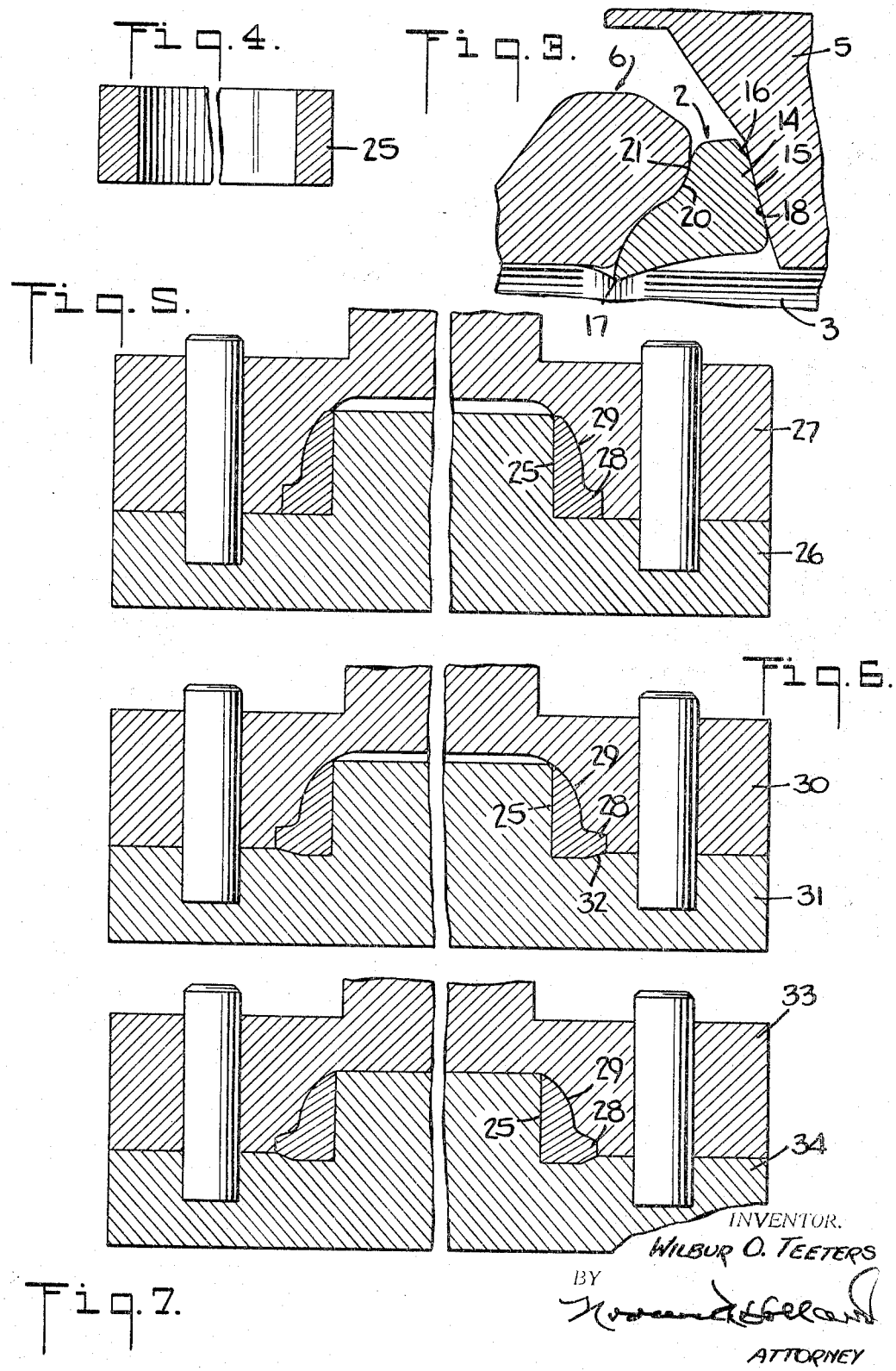

US United States Patent Office 3,321,947
Patented May 30, 1967

3,321,947
PIPE COUPLING AND METHOD OF MAKING
Wilbur O. Teeters, Norwood, N.J., assignors to Hoke Manufacturing Company, Inc., Cresskill, N.J., a corporation of New Jersey
Filed Sept. 13, 1965, Ser. No. 486,635
5 Claims. (Cl. 72—377)

The present invention relates to a compression pipe fitting or a coupling and its method of manufacture and more particularly to an improved compression coupling combining increased strength with reduced setting torque and high corrosion resistance. This coupling is an improvement over the coupling described in my co-pending application Ser. No. 188,023 filed Apr. 17, 1962 now Patent No. 3,215,457 dated Nov. 2, 1965 and this application is a continuation-in-part of application Ser. No. 188,023.

A pipe coupling is disclosed in the above application in which a pair of ring-like ferrules are compressed by a coupling nut into a flared fitting for providing a pipe coupling action. In this coupling action, a rolling or gyrating action of the rear ferrule is an important feature of the coupling operation. The present invention provides an improved rear ferrule and an improved method of making the rear ferrule giving an improved penetration control and also an improved rolling or gyrating sealing action. In addition, an improvement in the corrosion resistance of the rear ferrule results from the method of forming the ferrule in its preferred shape by the use of a coining operation.

Also, as will be more fully described below, a cold working of certain critical portions of the rear ferrule during the coining operation improves its corrosion resistance and also provides a rear ferrule selectively hardened in such a way that the desired rolling and material flowing action during coupling setting is more efficiently realized.

Accordingly, an object of the present invention is to provide an improved compression pipe coupling.

Another object of the present invention is to provide a pipe coupling with improved corrosion resistance.

Another object of the present invention is to provide a pipe coupling having an improved pipe penetration control.

Another object of the present invention is to provide an improved pipe coupling and method of making it.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 3 is an enlarged fragmentary sectional view of the rear ferrule of the coupling and portions of the adjacent coupling members in the fully set position;

FIG. 4 is a cross-sectional view of a blank from which the preferred embodiment of the rear ferrule is formed; and FIGS. 5 through 7 are vertical sectional views illustrating three successive steps in the coining of a preferred embodiment of the rear ferrule.

Figure 1:
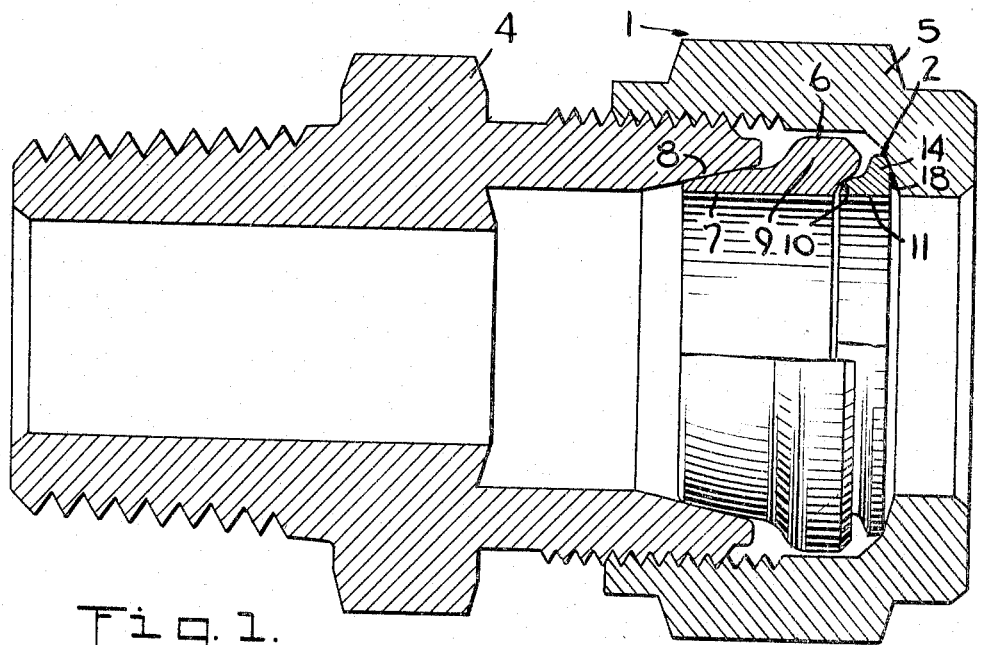
FIG. 1 is a vertical sectional view of a preferred embodiment of the coupling loosely assembled.
Figure 2:
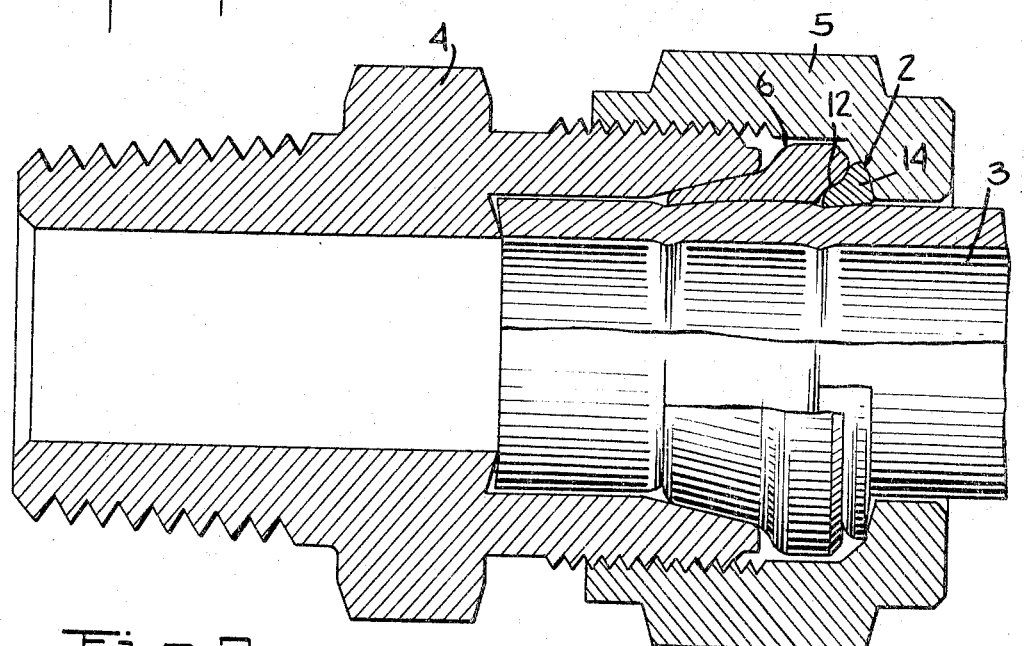
FIG. 2 is a vertical sectional view corresponding to FIG. 1 illustrating the coupling in its fully set position.

As indicated above the present invention relates to improvements in compression-type couplings. A coupling 1 is illustrated in FIGS. 1 and 2. A significant portion of the improved coupling action in this type of coupling is centered in the design and operation of the rear ferrule 2 and the present invention relates to improvements in the design, manufacture, and operation of this rear ferrule 2.

The overall coupling 1 and its operation, however, will first be briefly described to facilitate the description of the improvements of the present invention.

Compression couplings are used to connect tubes or pipes to other fittings such as valves or nipples without requiring the formation of threads in the coupled pipes. The coupling 1 herein will be described for attaching a pipe 3 to a nipple 4. The coupling 1 itself comprises three basic elements which are the coupling nut 5 and a pair of ring-like ferrules including a front 6 ferrule and the rear ferrule 2.

The front ferrule 6 is seen to have a ring-like shape with a cylindrical inner bore 7 and a forward tapered portion 8 terminating in an enlarged shoulder 9. The rear inner portion of the front ferrule comprises a generally beveled portion 10 which has a curved cross-section in a radial plan. This rear surface 10 of the front ferrule 6 comprises an annular channel with a concave or grooved shape.

The rear ferrule 2 also has a ring-like shape with a cylindrical inner bore 11 having a diameter sufficiently greater than that of the coupled pipe 3 to permit the ferrule 2 to be slipped over the pipe 3 when the ferrules 2 and 6 are assembled in the finger-tight relationship. The rear ferrule 2 has a rounded forward portion 12 which in a radially directed cross-section has an arcuate or convex shape. The rear portion of the rear ferrule 2 comprises an outwardly directed flange portion 14 whose rear surface 15 (FIG. 3) is beveled at its outer edge 16 to facilitate the initial finger-tight assembly by engaging the inclined caming surface of the nut 5. Such an improved coupling was described in my above mentioned co-pending application. As more fully described therein, this coupling is set by advancing the nut 5 onto the nipple 4. During this advance of the nut 5, the rear ferrule 2 is confined in front by the curved contour of the rear portion 10 of the front ferrule 6. As the advancing nut 5 applies force to the rear ferrule 2 it tends to gyrate or roll following the curved contours of the engaged portions 10 and 12 of the front and rear ferrules so that the front edge 17 of the rear ferrule 2 is moved inwardly against the pipe 3. The rear portion 14 of the rear ferrule 2 expands outwardly. As the nut 5 is tightened and the rear ferrule 2 rolls or gyrates and its forward edge 17 presses inwardly and its rear flange 14 expands outwardly, the mass of material of the rear ferrule 2 is under compression and re-shapes itself to the final form as illustrated in FIG. 3 under what may be best described as a modified fluid flow condition.

The above rolling action is significantly assisted by the contacting and curved portions 10 and 12 of the front and rear ferrules 6 and 2 respectively and in the preferred embodiment the concave portion 10 of the front ferrule has a slightly lesser curvature than does the curved forward portion 12 of the rear ferrule 2. The rolling or gyrating action is additionally assisted by an included flare or angle provided between a caming surface 18 on the nut 5 and the rear surface 15 of the rear ferrule 2. The angle may result from a beveling of one or the other or both of the nut 5 or the rear ferrule 2.

The ferrules 6 and 2 illustrated in FIGS. 1 through 3 include improved means for controlling their penetration into the pipe 3. FIG. 1, which illustrates the coupling in its finger-tight position, shows an annular space provided between the flanges 9 and 14 of the front and rear ferrules. This spacing permits the above described gyrating or rolling action of the rear ferrule 2 as the coupling is applied and set to its fully set position as illustrated in FIGS. 2 and 3. By providing the generally complementary curved portions 20 at the rear of the front ferrule 6 and 21 at the front and rear ferrule 2 it is seen that an effective stop means is provided for controlling or limiting the penetration of the edge 17 of the rear ferrule 2 into the coupled pipe 3. The ferrules are shaped or proportioned at 20 and 21 to cause these surfaces to meet when the desired degree of the rear ferrule 2 tilting and penetration has been achieved.

In the above described setting operation, it is clear that the nose or edge 17 of the rear ferrule 2 which bites into the coupled pipe 3 must be relatively hard and it is also preferable that the sliding or contacting curve surfaces 10 and 12 of the ferrules be relatively hard to facilitate the rolling action. At the same time, a modified fluid flow resulting from the re-shaping of the rear ferrule during its rolling action is facilitated by a relatively softer core in the rear ferrule 2. This deposition of material hardness is provided in the improved rear ferrule 2 of the present invention by forming the ferrule 2 by a manufacturing process which will now be described.

FIGS. 4 through 7 illustrate an improved method of forming a rear ferrule such as the ferrule 2 described above characterized by a forward curved nose portion and a radially directed flange portion.

While effective rear ferrules have been made by conventional lathe or cutting techniques on the usual automatic cutting machinery and have proven satisfactory as couplings for relatively soft materials such as copper and brass, greatly improved coupling action has been found to result from the following described manufacturing process. This process provides a novel combination of hardened outer zones and soft inner areas giving an ideal combination of biting action and material flow particularly for relatively hard metals including various steels or stainless steels. The improved and preferred forming process is a coining or stamping operation, where, preferably, the shaping is restricted as closely as practical to the zones requiring a hardened surface in the coupling setting action.

A blank or ring 25 of the particular material being used such as a stainless steel is first cut from a tube as shown in FIG. 4. In a first shaping operation as illustrated in FIG. 5, the blank 25 is placed on a base or die support plate 26 and a first coining operation using a shaping or coining die 27 is performed resulting in the partial formation of a thickness flange portion 28 and in a tapering or curving forward portion 29.

In a second coining operation, the flange portion 28 is again forced radially outwardly while the forward portion of the ferrule is coined closer to its final convexly curved shape as a second coining die 30 strikes the partially shaped blank 25 as it rests on a coining base plate 31 including a beveled surface 32 to shape the outer surface of the rear flange portion 28.

Preferably a final strike or coining operation with die 33 and base 34 is provided to complete the rear ferrule and to form the desired corner radii and the exact flange 28 and convex surface 29 desired for a particular ferrule.

The above series of coining operations or strikes is typical of the process and the steps are characterized by the use of a series of dies which shape the blank by working at the critical zones described. It is clear that the exact shapes of the tools or dies and the number of strikes used may be varied within the process described as long as the principle of working or shaping the critical zones of the ferrule is maintained.

It is seen that a ferrule has been formed having the desired cross section for the above described gyrating action and that during the formation a cold working operation has been performed with its principal effect being concentrated at the forward edge 33 of the ferrule and along the convex curved surface 29 and at the flange 28. The body of the ferrule inwardly of these zones and along the inner bore has been subjected to lesser forming stresses and thus remains relatively unhardened for providing the necessary masses of softer material for the fluid flow described above which occurs during the application of the ferrule and its re-shaping as required by the constriction of its forward portion and the expansion of its rear portion.

Not only does this coining operation provide a controlled hardening of the ferrule but it also has been found to provide a highly corrosion resistant ferrule at the critical edge and outer surface portions with respect to a wide range of fluids such as are handled by pipes coupled by such compression seals.

It will be seen that an improved pipe coupling and method of manufacture have been provided wherein the advantages of the coupling described in my prior application referred to above have been even more fully realized. The improved shaping and manufacturing method described herein is especially valuable in connection with the rear ferrule of the compression coupling described. The method of forming the rear ferrule provides a controlled hardening of critical portions of the rear ferrule while leaving other portions in a softer condition to permit a controlled deformation and flow during the setting of the coupling.

In addition, the method of forming the ferrule has also been found to provide increased corrosion resistance for typical fluids handled by couplings of this type.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. The method of manufacturing a ring-like rear ferrule for a two ferrule compression tube coupling and in which said rear ferrule has a generally convexly curved front portion having an arcuate shape in a longitudinal radial plane and for engaging a concave surface or the rear of the other ferrule and in which said rear ferrule also has a thicker radially outwardly directed flange-like back portion and in which the said front portion of said rear ferrule is constricted radially inwardly and the said back portion of said rear ferrule is expanded radially outwardly during the setting of the coupling comprising the steps of first forming a ring-like blank having a cylindrical center bore, thereafter first shaping the blank partially into the ferrule shape in a coining operation including a partial thinning and lengthening of the front portion of the blank and a partial flaring of the back portion outwardly to partially form a flange, thereafter coining the partially shaped ferrule and further thinning and curving the outermost material of the front portion and radially thickening the back portion to further form the flange, and finally further coining outer portions of the rear ferrule to complete the thinning and curving of the front portion and the forming of the flange on the back portion.

2. The method as claimed in claim 1 in which the blank is formed of steel.

3. The method of manufacturing a ring-like ferrule for a compression coupling having a generally tapering front portion and a thicker flange-like rear portion in which the front portion of said ferrule is constricted radially inwardly and the back portion of said ferrule is expanded radially outwardly during the setting of the coupling comprising the steps of forming a cylindrical blank, thereafter shaping the blank into the ferrule in a plurality of successive coining operations including thinning and lengthening the front portions of the blank and flaring the rear portions outwardly whereby the outermost portions of both the front and rear are work hardened by the coining operations.

4. The method as claimed in claim 3 in which said blank is formed of steel.

5. The method of manufacturing a ring-like ferrule for a compression coupling having a generally tapering front portion and a thicker radially outwardly directed flange-like back portion in which the front portion of said ferrule is constricted radially inwardly and the back portion of said ferrule is expanded radially outwardly during the setting of the coupling comprising the steps of forming a ring-like blank having a cylindrical center bore, thereafter shaping the blank into the ferrule in a plurality of coining operations including re-shaping the outermost portion of the blank thinning and lengthening the front of the blank and flaring the back portion outwardly whereby the worked outer portions of the front and back are work hardened by the coining operations and the inner portions are relatively unworked.

References Cited

UNITED STATES PATENTS

| | | | |
|---|---|---|---|
| 472,959 | 4/1892 | Bernhardt | 72—471 |
| 473,139 | 4/1892 | Bernhardt | 72—404 |
| 1,991,199 | 2/1935 | Eisele | 72—368 |
| 2,267,229 | 12/1941 | Zimmerman | 29—148.4 |
| 2,328,742 | 9/1943 | Rogers | 72—364 |

CHARLES W. LANHAM, *Primary Examiner.*

G. P. CROSBY, *Assistant Examiner.*